United States Patent
Ohya et al.

(10) Patent No.: US 9,232,166 B2
(45) Date of Patent: Jan. 5, 2016

(54) PHOTOELECTRIC CONVERSION APPARATUS, METHOD FOR DRIVING THE SAME, AND PHOTOELECTRIC CONVERSION SYSTEM USING FIRST AND SECOND ANALOG-TO-DIGITAL CONVERTERS TO CONVERT ANALOG SIGNAL FROM RESPECTIVE PLURAL ELECTRICAL SIGNAL SUPPLY UNITS BASED ON SIGNAL CHANGE

(71) Applicant: CANON KABUSHIKI KAISHA, Tokyo (JP)

(72) Inventors: Takeru Ohya, Machida (JP); Tomoya Onishi, Ayase (JP); Daisuke Kobayashi, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 311 days.

(21) Appl. No.: 13/764,648

(22) Filed: Feb. 11, 2013

(65) Prior Publication Data

US 2013/0214127 A1    Aug. 22, 2013

(30) Foreign Application Priority Data

Feb. 17, 2012    (JP) .................................. 2012-033357

(51) Int. Cl.
*H01J 40/14*    (2006.01)
*H04N 5/378*    (2011.01)
*H04N 5/3745*    (2011.01)

(52) U.S. Cl.
CPC ........... *H04N 5/378* (2013.01); *H04N 5/37455* (2013.01)

(58) Field of Classification Search
CPC ... H04N 5/378; H04N 5/3742; H04N 5/3355; H04N 5/37455
USPC .................... 250/208.1, 214 R; 348/294–324
See application file for complete search history.

(56) References Cited

U.S. PATENT DOCUMENTS 7,990,448 B2 *   8/2011   Sonoda ......................... 348/294
8,035,541 B2 *  10/2011   Onizuka et al. ............... 341/139

FOREIGN PATENT DOCUMENTS

JP    2006-203736 A    8/2006
JP    2009-296364 A   12/2009

\* cited by examiner

*Primary Examiner* — Que T Le
(74) *Attorney, Agent, or Firm* — Canon USA, Inc. IP Division

(57) ABSTRACT

A photoelectric conversion apparatus includes a pixel array configured to include a first analog-to-digital conversion unit and a second analog-to-digital conversion unit, a first electrical signal supply unit configured to supply an electrical signal to the first analog-to-digital conversion unit, and a second electrical signal supply unit configured to supply an electrical signal to the second analog-to-digital conversion unit.

13 Claims, 14 Drawing Sheets

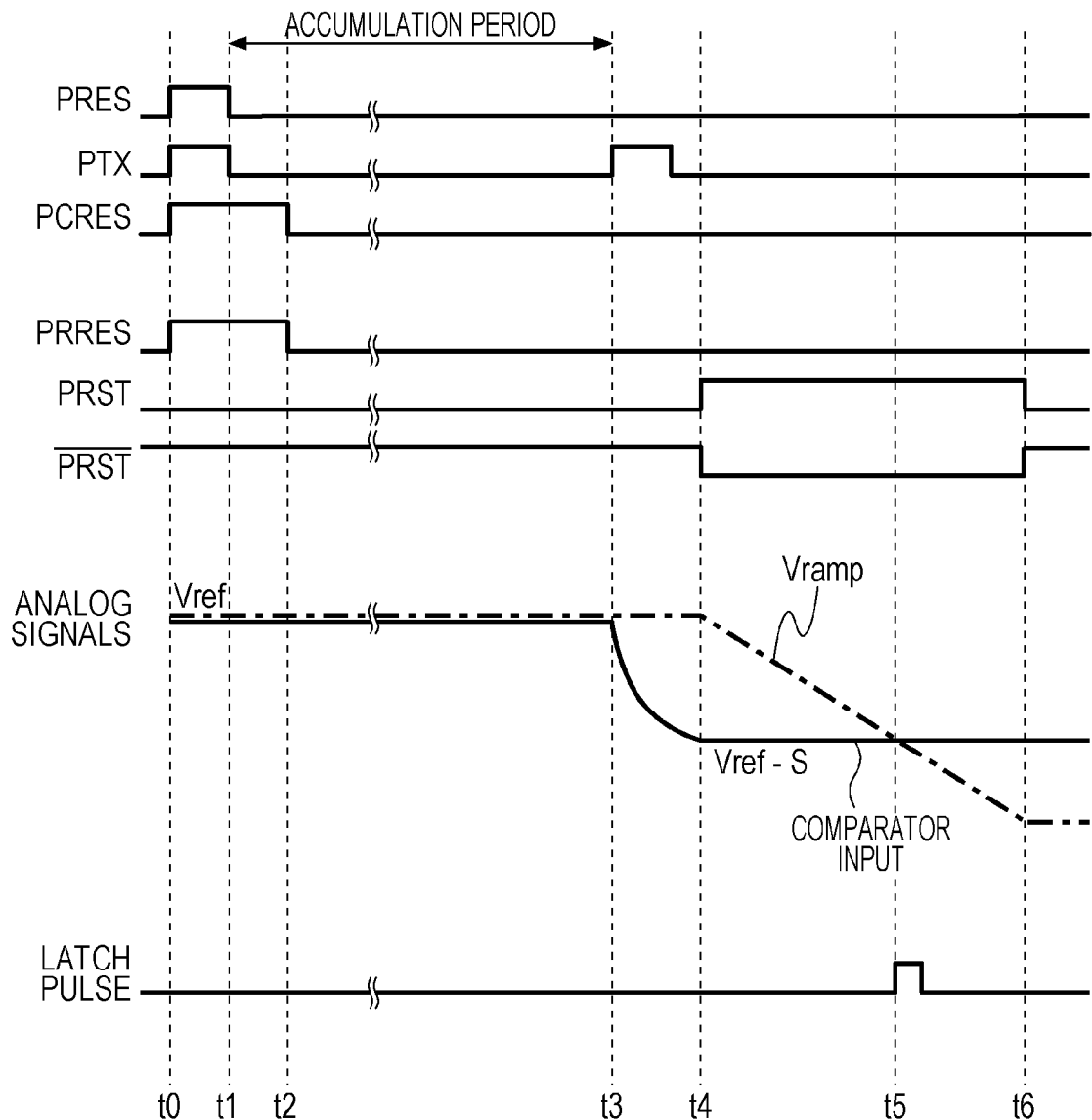

PHOTOELECTRIC CONVERSION APPARATUS, METHOD FOR DRIVING THE SAME, AND PHOTOELECTRIC CONVERSION SYSTEM USING FIRST AND SECOND ANALOG-TO-DIGITAL CONVERTERS TO CONVERT ANALOG SIGNAL FROM RESPECTIVE PLURAL ELECTRICAL SIGNAL SUPPLY UNITS BASED ON SIGNAL CHANGE

BACKGROUND OF THE INVENTION

1. Field of the Invention

One disclosed aspect of the embodiments relates to a photoelectric conversion apparatus and a photoelectric conversion system in which each pixel includes an analog-to-digital conversion unit that converts an analog signal into a digital signal.

2. Description of the Related Art

Currently, as disclosed in Japanese Patent Laid-Open No. 2006-203736, a photoelectric conversion apparatus is known in which pixel signals to be output from a plurality of pixels are subjected to analog-to-digital conversion in the plurality of pixels. A signal output from each pixel is a digital signal, and may be repeatedly output nondestructively.

In addition, in Japanese Patent Laid-Open No. 2009-296364, a photoelectric conversion apparatus is disclosed in which pixels are arranged in a matrix and different bias voltages are supplied to at least signal lines, to each of which pixels in each column output signals, in adjacent columns.

SUMMARY OF THE INVENTION

In the embodiment described in Japanese Patent Laid-Open No. 2006-203736, because loads are concentrated at a single electrical signal supply unit that supplies an electrical signal to an analog-to-digital conversion unit of each pixel while the analog-to-digital conversion units are operating, there has been a problem in that it takes time for the signal values of the electrical signals to stabilize.

In addition, in the embodiment described in Japanese Patent Laid-Open No. 2009-296364, there is no description as to a configuration in which each pixel includes an analog-to-digital conversion unit.

An aspect of the present embodiments provides a photoelectric conversion apparatus including a pixel array configured to include a plurality of pixels, a first electrical signal supply unit, and a second electrical signal supply unit, which is different from the first electrical signal supply unit. Each of the plurality of pixels includes a photoelectric conversion unit that generates signal charge. The pixel array includes a first analog-to-digital conversion unit and a second analog-to-digital conversion unit, which is different from the first analog-to-digital conversion unit, that each convert a signal based on the signal charge into a digital signal. The first analog-to-digital conversion unit is electrically connected to the first electrical signal supply unit. The second analog-to-digital conversion unit is electrically connected to the second electrical signal supply unit.

Another aspect of the embodiments provides a photoelectric conversion apparatus including a pixel array configured to include a plurality of pixels, a first electrical signal supply unit, and a second electrical signal supply unit, which is different from the first electrical signal supply unit. Each of the plurality of pixels includes a photoelectric conversion unit that generates signal charge. The pixel array includes a first analog-to-digital conversion unit to which an electrical signal is supplied from the first electrical signal supply unit and that converts a signal based on the signal charge into a digital signal and a second analog-to-digital conversion unit to which an electrical signal is supplied from the second electrical signal supply unit and that converts a signal based on the signal charge into a digital signal.

According to the aspects of the embodiments, loads applied to each electrical signal supply unit may be reduced, thereby reducing time taken for the signal values of electrical signals to stabilize.

Further features of the embodiments will become apparent from the following description of exemplary embodiments with reference to the attached drawings.

BRIEF DESCRIPTION OF THE DRAWINGS

FIG. 3 is a diagram illustrating an example of the operation of the photoelectric conversion apparatus.

DESCRIPTION OF THE EMBODIMENTS

Embodiments will be described hereinafter with reference to the drawings. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

First Embodiment

Figure 1:
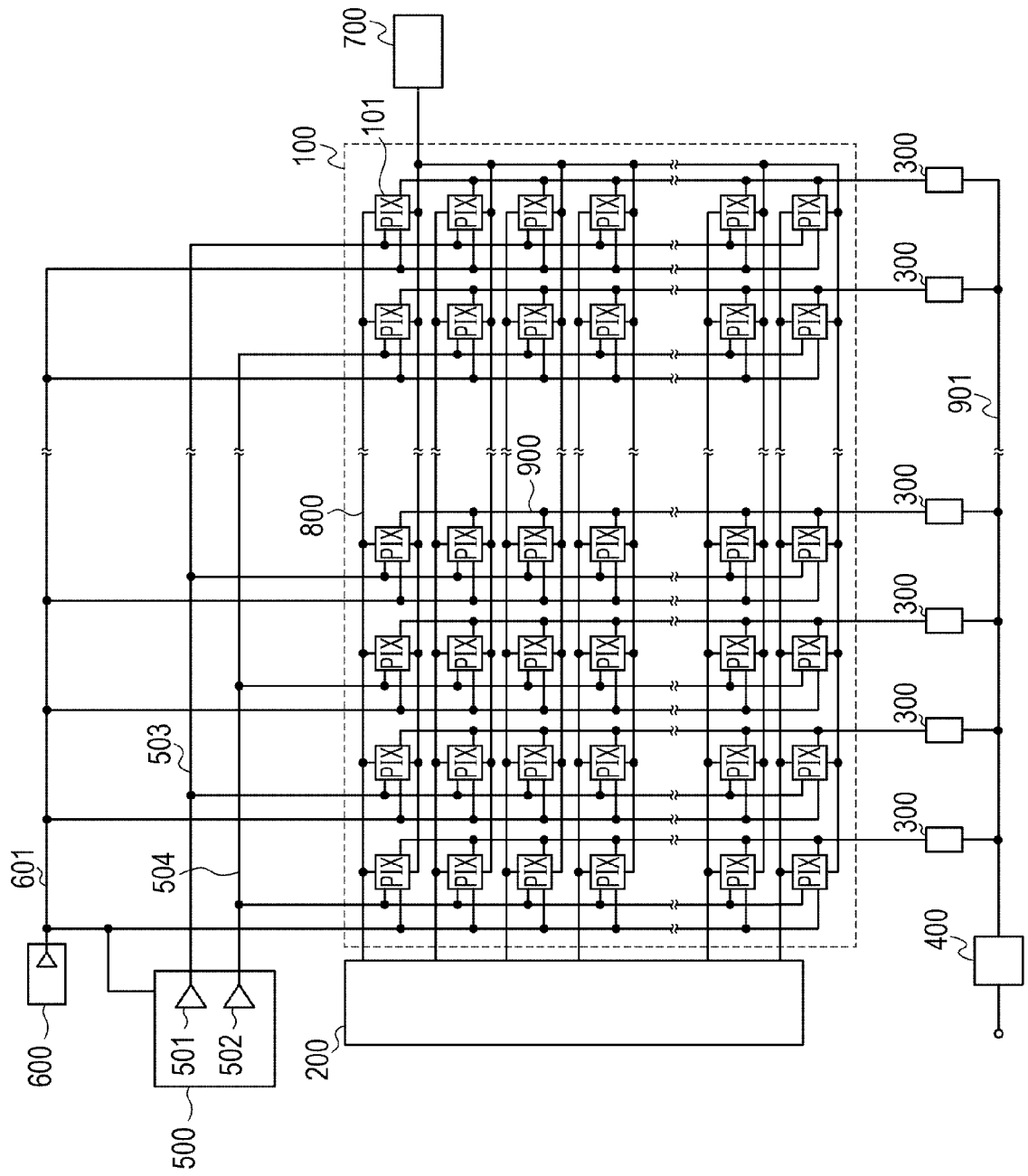
FIG. 1 is a diagram illustrating an example of a photoelectric conversion apparatus.

FIG. 1 is a block diagram illustrating the configuration of a photoelectric conversion apparatus according to the present embodiment. The photoelectric conversion apparatus includes a pixel array 100 in which a plurality of pixels 101 are arranged in a matrix. The photoelectric conversion apparatus also includes a timing generation unit 200, line memories 300, an output unit 400, a ramp signal unit 500, a reference signal unit 600, and a counter 700.

Each pixel 101 is configured by including a photoelectric conversion unit, a signal output unit, and an analog-to-digital conversion unit, and outputs a digital signal.

The ramp signal unit 500 includes a first ramp signal generator 501 and a second ramp signal generator 502. Each ramp signal generator serves as an electrical signal supply unit in the present embodiment. A ramp signal is an electrical signal supplied to the analog-to-digital conversion unit of each pixel from either the first ramp signal generator 501 or the second ramp signal amplifier 502. The first and second ramp signal generator 501 and 502 are connected to pixels 101 in different pixel columns. That is, the first ramp signal generator 501 is connected, through a first ramp signal line 503, to pixels 101 in even columns viewed from a timing generation unit 200 side. On the other hand, the second ramp signal generator 502 is connected, through a second ramp signal line 504, to pixels 101 in add columns viewed from the timing generation unit 200 side. In the following description, when an "A-th column" is simply referred to herein, the position of the column is defined from the timing generation unit 200 side, unless otherwise specified.

The reference signal unit 600 is connected to the pixels 101 through a reference signal supply line 601.

The timing generation unit 200 generates signals for controlling the operation of the photoelectric conversion apparatus, and supplies the control signals through control signal supply lines 800. Although each of the control signal supply lines 800 is indicated by a single line to simplify the diagram, each of the control signal supply lines 800 may be a plurality of signal lines.

The line memories 300 are provided for the columns of the pixel array 100, and hold digital signals transmitted through vertical transfer buses 900. When one of the line memories 300 has been selected by a column selection circuit, which is not illustrated, the selected line memory 300 outputs the held digital signals. The digital signals output from the line memories 300 are transmitted to the output unit 400 through a horizontal transfer bus 901.

Each of the vertical transfer buses 900 and the horizontal transfer bus 901 may be each configured by a single signal line. In this case, the pixels 101 and the line memories 300 output serial digital signals. Alternatively, each of the vertical transfer buses 900 and the horizontal transfer bus 901 may be each configured by a plurality of signal lines. In this case, the pixels 101 and the line memories 300 output at least some bits of digital signals in parallel with one another. The number of signal lines that configure each of the vertical transfer buses 900 provided in the pixel array 100 may be as small as possible. That is, by making the number of signal lines that configure each of the vertical transfer buses 900 smaller than the number of signal lines that configure each of the horizontal transfer buses 901, the area of the photoelectric conversion units in the pixel array 100 may be large compared to when the number of signal lines that configure the vertical transfer bus 900 is the same as the number of signal lines that config- ure each of the horizontal transfer buses 901. Therefore, the sensitivity and the maximum charge capacity of the photoelectric conversion apparatus may be improved. On the other hand, by decreasing the number of signal lines that configure each of the vertical transfer buses 900, the speed at which the signals output from the pixels 101 are transferred decreases. Therefore, the photoelectric conversion apparatus may be designed such that the desired sensitivity, maximum charge capacity, and transfer speed of the signals are appropriately adjusted.

The output unit 400 buffers digital signals input through the horizontal transfer bus 901.

Figure 2A:
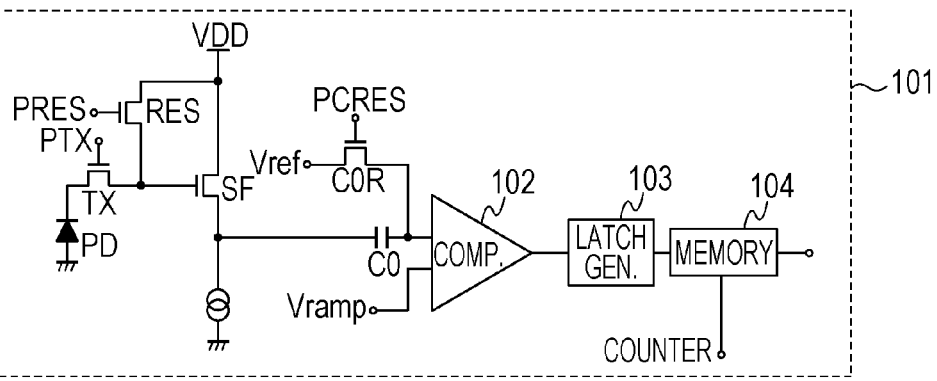
FIG. 2A is a diagram illustrating an example of a pixel.

Next, an example of the configuration of each pixel 101 will be described. FIG. 2A is a diagram illustrating the configuration of the pixel 101 according to the present embodiment.

The pixel 101 includes a photoelectric conversion unit PD, transistors TX, SF, RES, and C0R, a capacitor C0, a comparator 102, a latch signal generator 103, and a pixel memory 104.

The photoelectric conversion unit PD generates and accumulates signal charge in accordance with the amount of incident light. When a signal PTX for controlling the conductivity of the transistor TX has become active, the signal charge accumulated in the photoelectric conversion unit PD is transferred to a node of a control electrode of the transistor SF. This node will be referred to as a floating diffusion (FD) portion hereinafter. The transistor SF operates as a source follower circuit along with a current source Iconst, and the output thereof is applied to one input terminal of the comparator 102 through the capacitor C0. When a signal PRES for controlling the conductivity of the transistor RES has become active, the potential of the FD portion is reset in accordance with voltage VDD. The transistor SF is a signal output unit included in the pixel 101.

When a signal PCRES for controlling the transistor C0R has become active, the one input terminal of the comparator 102 is reset in accordance with a reference signal Vref.

The comparator 102 compares the potential of the one input terminal thereof with the level of a reference signal Vramp supplied to another input terminal thereof. When the magnitude relationship between the potentials of the two input terminals of the comparator 102 is reversed, the output of the comparator 102 changes from high to low or low to high. When the output of the comparator 102 has changed from high to low or low to high, the latch signal generator 103 outputs a latch signal.

Upon receiving the latch signal, the pixel memory 104 holds a current count value of the counter 700. Furthermore, upon receiving a selection signal, which is not illustrated, the pixel memory 104 outputs a digital signal. The analog-to-digital conversion unit of the pixel 101 according to the present embodiment is configured by including the comparator 102, the latch signal generator 103, and the pixel memory 104.

Figure 2B:
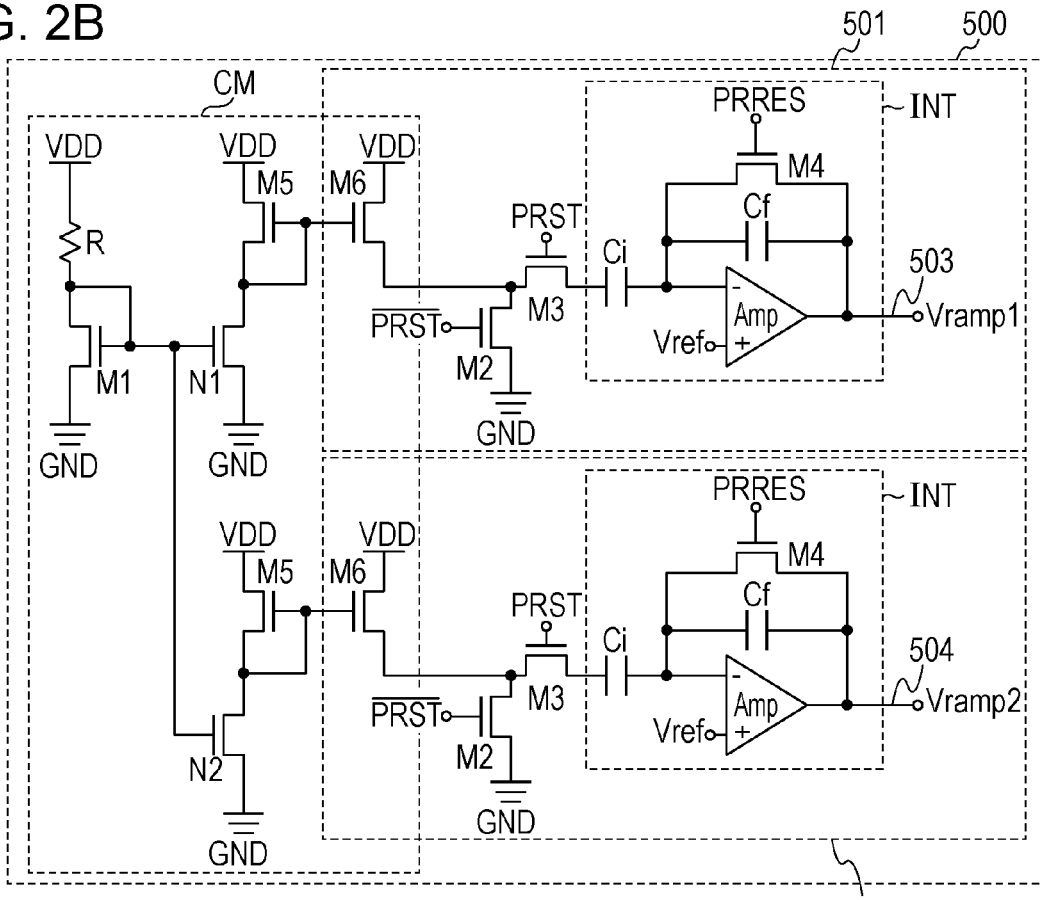
FIG. 2B is a diagram illustrating an example of an electrical signal supply unit.

Next, an example of the configuration of the ramp signal unit 500 will be described. FIG. 2B is a diagram illustrating an example of the configuration of the ramp signal unit 500 according to the present embodiment.

The ramp signal unit 500 includes a current mirror CM, the first ramp signal generator 501, and the second ramp signal generator 502. The first ramp signal generator 501 and the second ramp signal generator 502 each include transistors M2 and M3, a capacitor Ci, and an integrating circuit INT.

The current mirror CM includes a resistor R, transistors M1, N1, and N2. The resistor R and the transistor M1 are connected in series with each other between power supply voltage VDD and ground voltage GND, and a control electrode of the transistor M1 is connected to a node between the resistor R and a main electrode of the transistor M1. One main electrode of the transistor N1 is connected to the ground voltage GND, and another main electrode is connected to a node between the transistors M2 and M3 of the first ramp signal generator 501. In addition, a control electrode of the transistor N1 is connected to the control electrode of the transistor M1. Similarly, one main electrode of the transistor N2 is connected to the ground voltage GND, and another main electrode is connected to a node between the transistors M2 and M3 of the second ramp signal generator 502. In addition, a control electrode of the transistor N2 is connected to the control electrode of the transistor M1.

The integrating circuits INT included in the ramp signal generators 501 and 502 are each configured by including a differential amplifier Amp, a feedback capacitor Cf, and a transistor M4 for resetting the feedback capacitor Cf.

The current mirror CM and the integrating circuits INT of the ramp signal generators 501 and 502 are connected to each other through the transistors M3 and the capacitors Ci included in the ramp signal generators 501 and 502, respectively. The transistors M3 of the ramp signal generators 501 and 502 are controlled by signals having an opposite phase to signals for controlling the operation of the transistors M2.

Next, an example of the configuration of the reference signal unit 600 will be described with reference to FIG. 2C.

The reference signal unit 600 includes variable resistors R1 and R2 and an operational amplifier OP1. The variable resistors R1 and R2 are connected in series with each other between the power supply voltage VDD and the ground voltage GND. A non-inverting input terminal of the operational amplifier OP1 is connected to a node between the variable resistors R1 and R2. An output terminal and an inverting input terminal of the operational amplifier OP1 are connected to each other.

Next, an operation for generating a digital signal in each pixel 101 will be described. FIG. 3 is a timing chart illustrating the operation of the pixel 101 according to the present embodiment. The transistors illustrated in FIGS. 1 and 2A to 2C are assumed to be turned on when the control signals supplied thereto become an H level. In addition, in FIG. 3, the potential of the one input terminal of the comparator 102 is indicated by a solid line as "comparator input", and the output of the ramp signal unit 500 is indicated by a dash-dot line as "Vramp" in an "analog signals" item. In addition, the latch signal output from the latch signal generator 103 is indicated as "latch pulse".

At a time t0, the signals PRES and PTX become the H level, and the transistors TX and RES are turned on. Therefore, the signal charge accumulated in the photoelectric conversion unit PD is discharged to the power supply VDD through the FD portion. The output of the source follower circuit configured by the transistor SF and the current source Iconst is an output according to the power supply VDD.

Since the signal PRST is at an L level at the time t0, the transistors M3 are off, and the transistors M2 are on.

At the time t0, the signal PCRES also becomes the H level, and the transistor C0R is turned on. Therefore, the one input terminal of the comparator 102 is reset.

At the time t0, the signal PRRES also becomes the H level, and the transistors M4 of the first ramp signal generator 501 and the second ramp signal generator 502 are turned on. Therefore, the feedback capacitors Cf of the ramp signal unit 500 are reset.

At a time t1, the signals PRES and PTX become the L level, and the transistors TX and RES are turned off. The photoelectric conversion unit PD is electrically separated from the FD portion, and becomes able to accumulate signal charge.

At a time t2, the signal PCRES becomes the L level, and the transistor C0R is turned off. Therefore, the capacitor C0 holds a potential difference between a potential obtained by resetting the FD portion and the reference signal Vref.

At the time t2, the signal PRRES also becomes the L level, and the transistors M4 of the first ramp signal generator 501 and the second ramp signal generator 502 are turned off. Thus, the resetting of the feedback capacitors Cf is completed.

At a time t3, the signal PTX becomes the H level, and the signal charge accumulated in the photoelectric conversion unit PD is transferred to the FD portion. Therefore, the output of the source follower circuit changes. If the amount of change in the output is denoted by S, the potential of the one input terminal of the comparator 102 is Vref−S. It is to be noted that a period in which the signal PTX, which becomes the H level at the time t3, is at the L level is an accumulation period, which begins at the time t1.

At a time t4, the signal PRST becomes the H level, and the transistors M3 of the first ramp signal generator 501 and the second ramp signal generator 502 are turned on, and the transistors M2 are turned off. Therefore, paths from the current mirror CM to the capacitors Ci become conductive, and outputs Vramp1 and Vramp2 of the integrating circuits INT gradually decrease in accordance with the amount of current supplied from the current mirror CM.

In addition, the counter 700 begins a count operation in synchronization with the operation of the transistors M2 and M3 of the ramp signal generators 501 and 502.

At a time t5, a magnitude relationship between "comparator input" and "Vramp" is reversed, and the latch signal generator 103 outputs a latch signal of the H level. Upon receiving the latch signal, the pixel memory 104 holds the current count value.

At a time t6, the signal PRST becomes the L level, and the gradual decrease in the reference signals Vramp stops, which ends an analog-to-digital conversion period.

The pixel memory 104 of each pixel 101 holds the count value held at the time t5. The timing generation unit 200 outputs, for each pixel row, a count value from the pixel memory 104 in each pixel 101 to the line memory 300 in each pixel column. The count value is sequentially output to the output unit 400 from the line memory 300 in each column, and the photoelectric conversion apparatus outputs the count value output from each pixel 101.

The photoelectric conversion apparatus according to the present embodiment includes the ramp signal unit 500 including the plurality of ramp signal generators 501 and 502. Therefore, loads on each of the ramp signal generators 501 and 502 may be reduced, thereby reducing time taken for the potential of the ramp signals to stabilize. Accordingly, the speed of the operation of the analog-to-digital conversion unit of each pixel 101 may be increased.

The ramp signal generators 501 and 502 according to the present embodiment have been described on the basis of a configuration in which the pixels 101 are connected to different ramp signal generators in the even columns and in the odd columns viewed from the timing generation unit 200 side. The present embodiment is not limited to this mode. For example, a mode may be adopted in which X columns (X is a natural number equal to or larger than 2) of pixels 101 are arranged in the pixel array 100, and the pixels 101 in first to n-th columns (n is a natural number equal to or larger than 1 and smaller than X) among the X columns are connected to the first ramp signal generator 501 and the pixels 101 in (n+1)th to X-th columns are connected to the second ramp signal generator 502. However, the configuration in which the even columns and the odd columns viewed from the timing generation unit 200 side are connected to different ramp signal generators as in the present embodiment may produce certain advantageous effects, which will be described hereinafter. The output characteristics of the plurality of ramp signal generators 501 and 502 might be different from each other in terms of the ramp signals. In this case, in the mode in which the first to n-th columns and the (n+1)th to X-th columns are connected to different ramp signal generators, an image having pattern noise might be undesirably obtained in which a certain region uniformly stands out or is faded compared to other regions. Human eyes have a tendency not to recognize pattern noise when the spatial frequency of an image is high compared to when the spatial frequency of an image is low. Therefore, by connecting different ramp signal generators to adjacent columns as in the present embodiment, the spatial frequency of an image becomes high, thereby obtaining an image in which humans hardly recognize pattern noise.

Figure 11A:
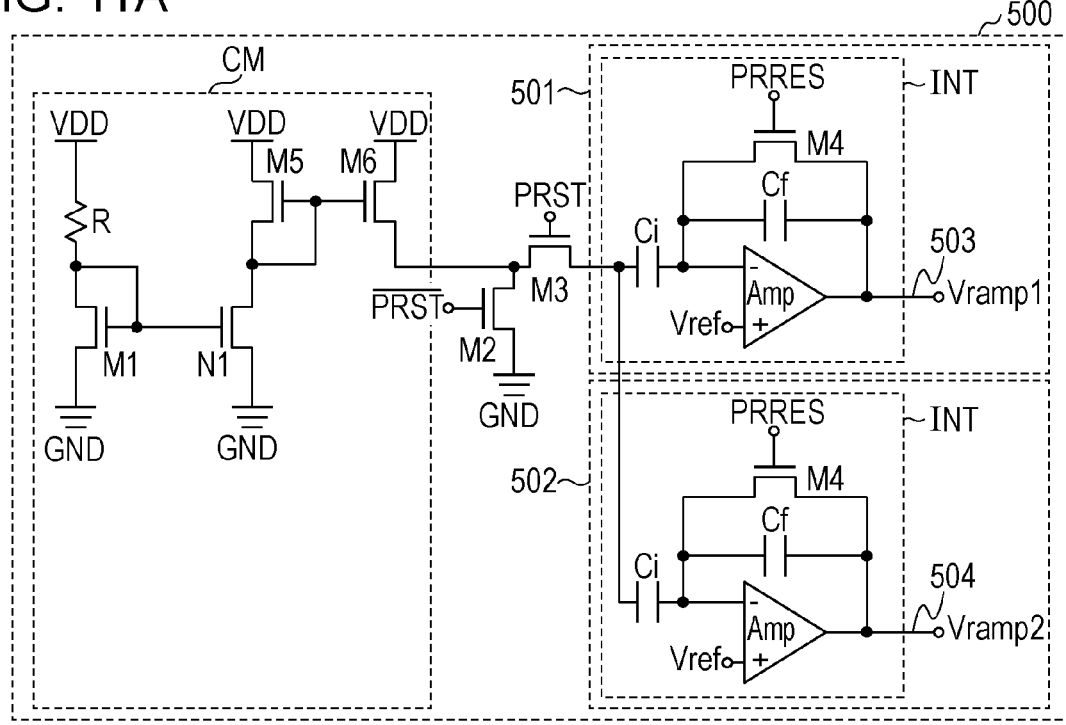
FIG. 11A is a diagram illustrating another example of the electrical signal supply unit.
Figure 11B:
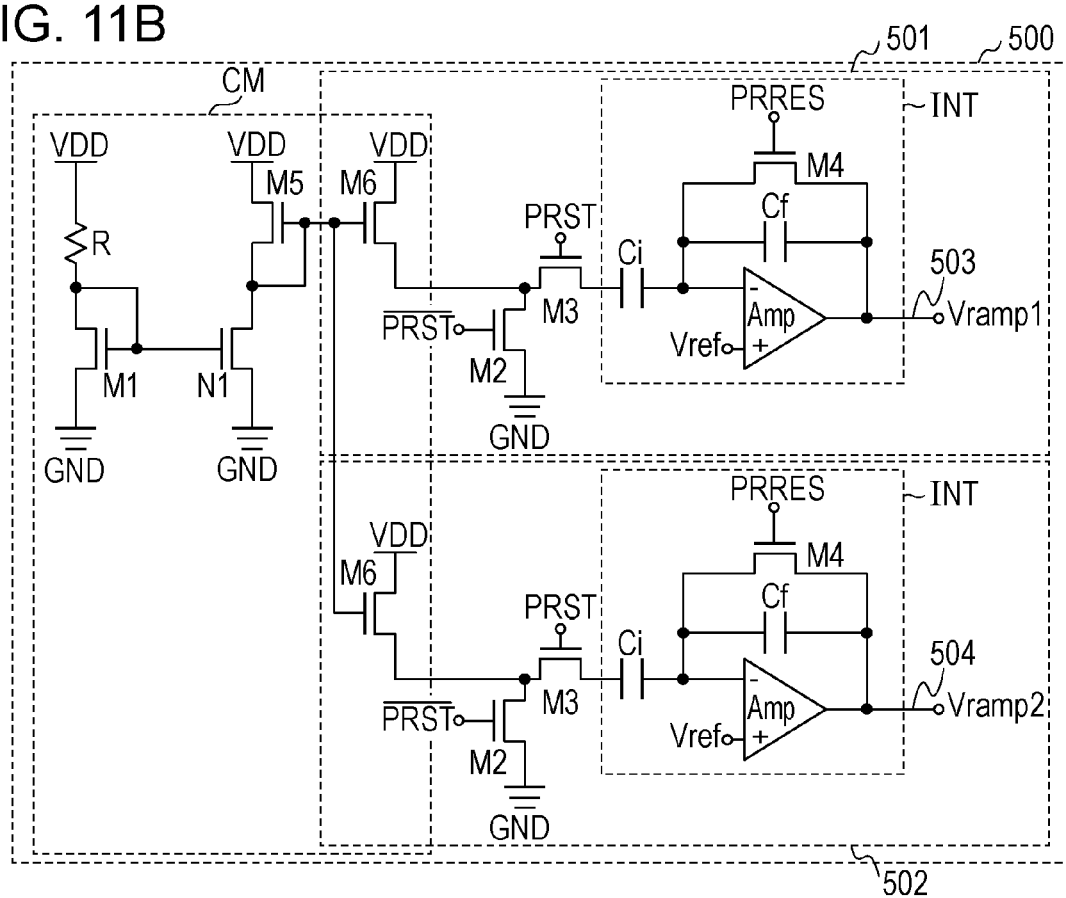
FIG. 11B is a diagram illustrating another example of the electrical signal supply unit.

The present embodiment has been described on the basis of the ramp signal unit 500 illustrated in FIG. 2B. The configuration of the ramp signal unit 500 may be a configuration by which the plurality of ramp signals Vramp1 and Vramp2 may be supplied. For example, a ramp signal unit 500 illustrated in FIG. 11A may be used. In the ramp signal unit 500 illustrated in FIG. 11A, each of ramp signal generators 501 and 502 is configured by including an integrating circuit INT. Alternatively, a ramp signal unit 500 illustrated in FIG. 11B may be used. Each of ramp signal generators 501 and 502 illustrated in FIG. 11B includes an integrating circuit INT and transistors M2, M3, and M6.

The ramp signal unit 500 may include the plurality of ramp signal generators 501 and 502, and at least each of the ramp signal generators 501 and 502 may include the integrating circuit INT. Therefore, loads on each of the ramp signal generators 501 and 502 may be reduced, thereby reducing the time taken for the potential of the ramp signals to stabilize. Accordingly, the speed of the operation of the analog-to-digital conversion unit of each pixel 101 may be increased.

Second Embodiment

A photoelectric conversion apparatus according to the present embodiment will be described hereinafter with reference to the drawings. In the following description, differences from the first embodiment will be mainly described.

Figure 4:
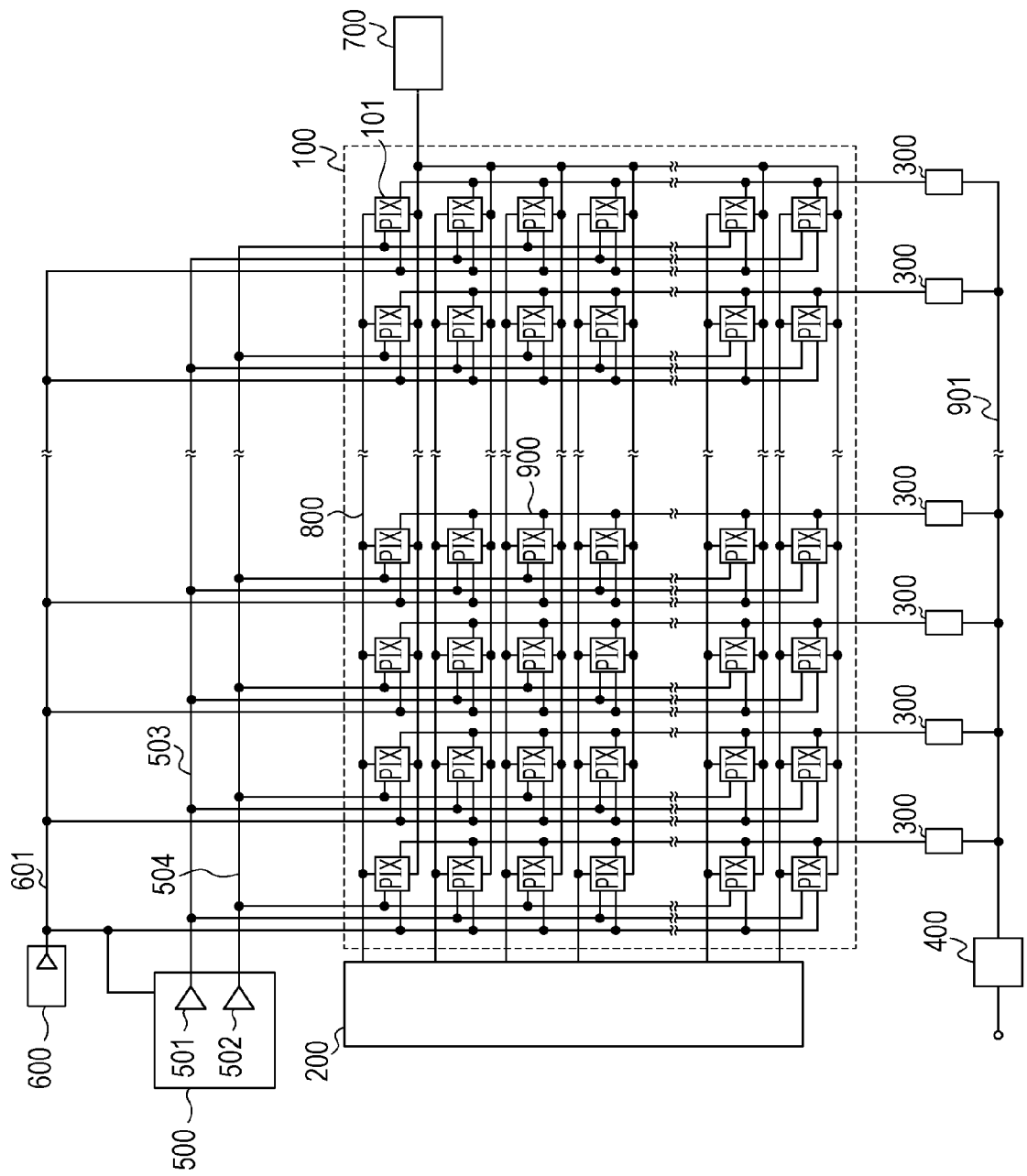
FIG. 4 is a diagram illustrating another example of the operation of the photoelectric conversion apparatus.

FIG. 4 is a block diagram illustrating the configuration of the photoelectric conversion apparatus according to the present embodiment. In the photoelectric conversion apparatus illustrated in FIG. 4, components having the same functions as in FIG. 1 are given the same reference numerals as in FIG. 1, and description thereof is omitted.

As in the first embodiment, a ramp signal unit 500 includes a plurality of ramp signal generators 501 and 502. In the photoelectric conversion apparatus according to the present embodiment, the ramp signal generators 501 and 502 are connected to pixels 101 in different pixel rows. That is, the first ramp signal generator 501 is connected, through a first ramp signal line 503, to the pixels 101 in even rows viewed from an upper direction of the figure. On the other hand, the second ramp signal generator 502 is connected, through a second ramp signal line 504, to the pixels 101 in odd rows viewed from the upper direction of the figure. In the following description, when an "A-th row" is simply referred to herein, the position of the row is defined from the upper direction of a figure, unless otherwise specified.

Figure 2C:
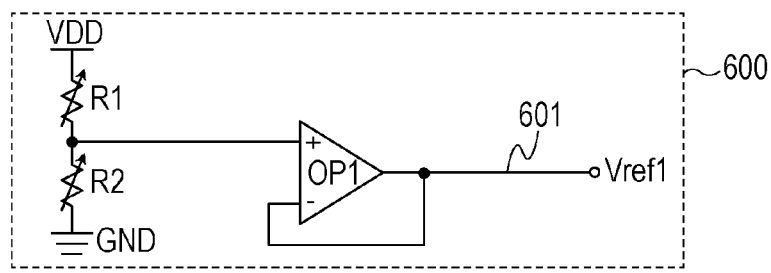
FIG. 2C is a diagram illustrating another example of the electrical signal supply unit.

The ramp signal unit 500 and a reference signal unit 600 may have the same configurations as those described in the first embodiment with reference to FIGS. 2B and 2C, respectively.

In addition, as in the first embodiment, the photoelectric conversion apparatus according to the present embodiment may be operated on the basis of the timing chart illustrated in FIG. 3.

As in the first embodiment, the photoelectric conversion apparatus according to the present embodiment includes the ramp signal unit 500 including the plurality of ramp signal generators 501 and 502. Therefore, loads on each of the ramp signal generators 501 and 502 may be reduced, thereby reducing the time taken for the potential of the ramp signals to stabilize. Accordingly, the speed of the operation of the analog-to-digital conversion unit of each pixel 101 may be increased.

Third Embodiment

A photoelectric conversion apparatus according to the present embodiment will be described hereinafter with reference to the drawings. In the following description, differences from the first embodiment will be mainly described.

Figure 5:
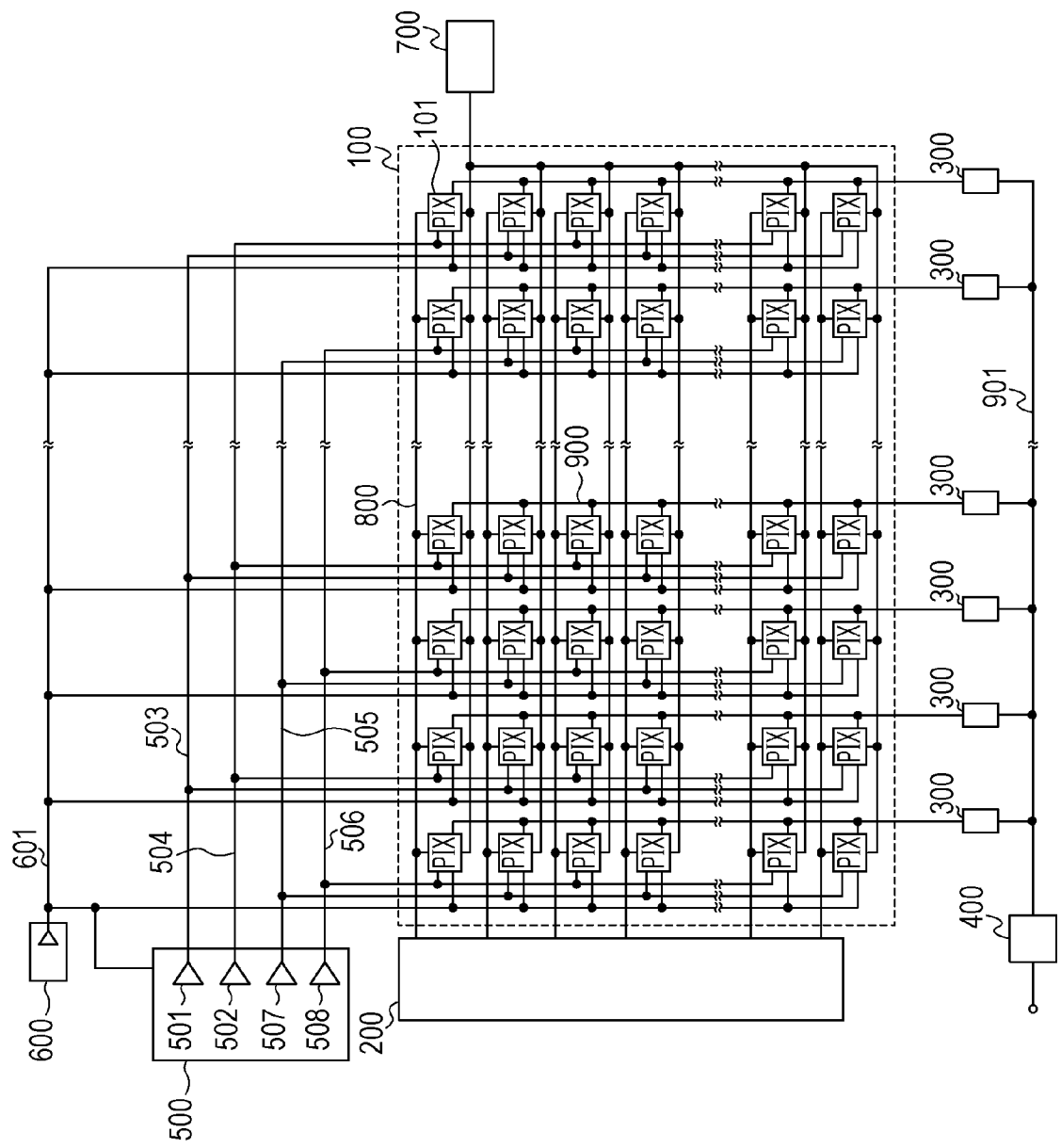
FIG. 5 is a diagram illustrating another example of the operation of the photoelectric conversion apparatus.

FIG. 5 is a block diagram illustrating the configuration of the photoelectric conversion apparatus according to the present embodiment. In the photoelectric conversion apparatus illustrated in FIG. 5, components having the same functions as in FIG. 1 are given the same reference numerals as in FIG. 1, and description thereof is omitted.

A ramp signal unit 500 of the photoelectric conversion apparatus according to the present embodiment includes a plurality of ramp signal generators 501, 502, 507, and 508. The first ramp signal generator 501 and a pixel 101 in a second row and a second column are connected to each other through a first ramp signal line 503. The second ramp signal generator 502 and a pixel 101 in a first row and the second column are connected to each other through a second ramp signal line 504. The third ramp signal generator 507 and a pixel 101 in the second row and a first column are connected to each other through a third ramp signal line 505. The fourth ramp signal generator 508 and a pixel 101 in the first row and the first column are connected to each other through a fourth ramp signal line 506. That is, the four pixels 101 in the two rows and the two columns are connected to different ramp signal generators. In other words, this is a mode in which different ramp signal generators are connected to the pixels 101 in each row and column. More specifically, pixels in n rows by m columns (n and m are natural numbers equal to or larger than 2) are determined as a block, and the pixels in each block are connected to different ramp signal generators in each row and column.

Figure 6:
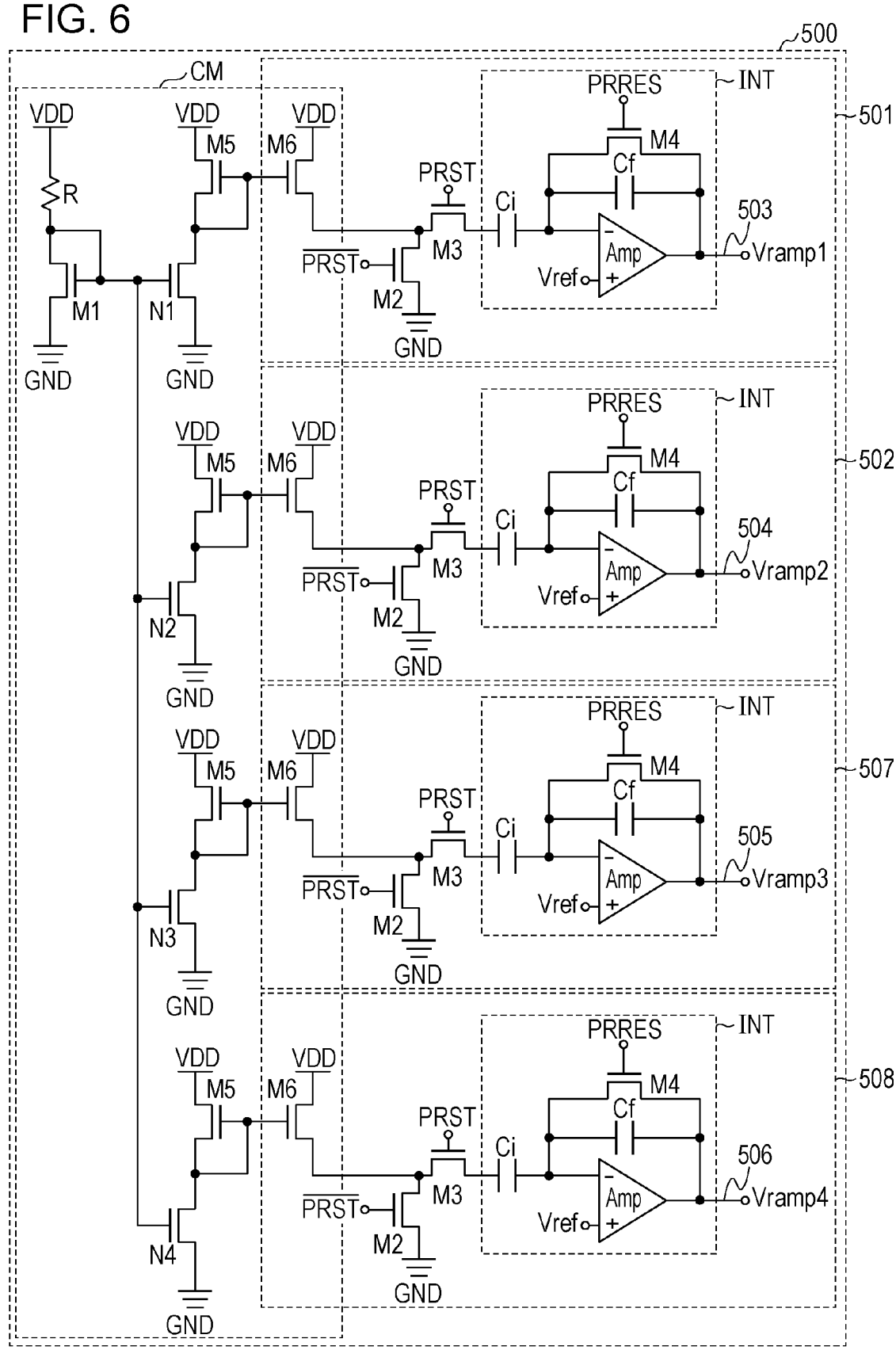
FIG. 6 is a diagram illustrating another example of the electrical signal supply unit.

Next, an example of the configuration of the ramp signal unit 500 according to the present embodiment will be described. FIG. 6 is a diagram illustrating an example of the configuration of the ramp signal unit 500 according to the present embodiment.

The ramp signal unit 500 includes the current mirror CM, the first ramp signal generator 501, the second ramp signal generator 502, the third ramp signal generator 507, and the fourth ramp signal generator 508. Each of the ramp signal generators 501, 502, 507, and 508 includes transistors M2 and M3, a capacitor Ci, and an integrating circuit INT.

The current mirror CM includes a resistor R, transistors M1, N1, N2, N3, and N4. One main electrode of each of the transistors N1, N2, N3, and N4 is connected to ground voltage GND, and another main electrode of each of the transistors N1, N2, N3, and N4 is connected to a node between the transistors M2 and M3 of each of the ramp signal generators

501, 502, 507, and 508, respectively. A control electrode of each of the transistors N1, N2, N3, and N4 is connected to a control electrode of the transistor M1.

The integrating circuit INT included in each of the ramp signal generators 501, 502, 507, and 508 includes an integrating circuit configured by a differential amplifier Amp and a feedback capacitor Cf, and also includes a transistor M4 for resetting the feedback capacitor Cf.

The current mirror CM and the integrating circuit INT of each of the ramp signal generators 501, 502, 507, and 508 are connected to each other through the transistor M3 and the capacitor Ci included in each of the ramp signal generators 501, 502, 507, and 508. The transistor M3 included in each of the ramp signal generators 501, 502, 507, and 508 is controlled by a signal having opposite phase to a signal for controlling the operation of the transistor M2.

As in the first embodiment, the photoelectric conversion apparatus according to the present embodiment may be operated on the basis of the timing chart illustrated in FIG. 3.

As in the first embodiment, the photoelectric conversion apparatus according to the present embodiment includes the ramp signal unit 500 including the plurality of ramp signal generators 501, 502, 507, and 508. Therefore, loads on each of the ramp signal generators 501, 502, 507, and 508 may be reduced, thereby reducing the time taken for the potential of the ramp signals to stabilize. Accordingly, the speed of the operation of the analog-to-digital conversion unit of each pixel 101 may be increased.

Fourth Embodiment

A photoelectric conversion apparatus according to the present embodiment will be described hereinafter with reference to the drawings. In the following description, differences from the third embodiment will be mainly described.

Figure 7:
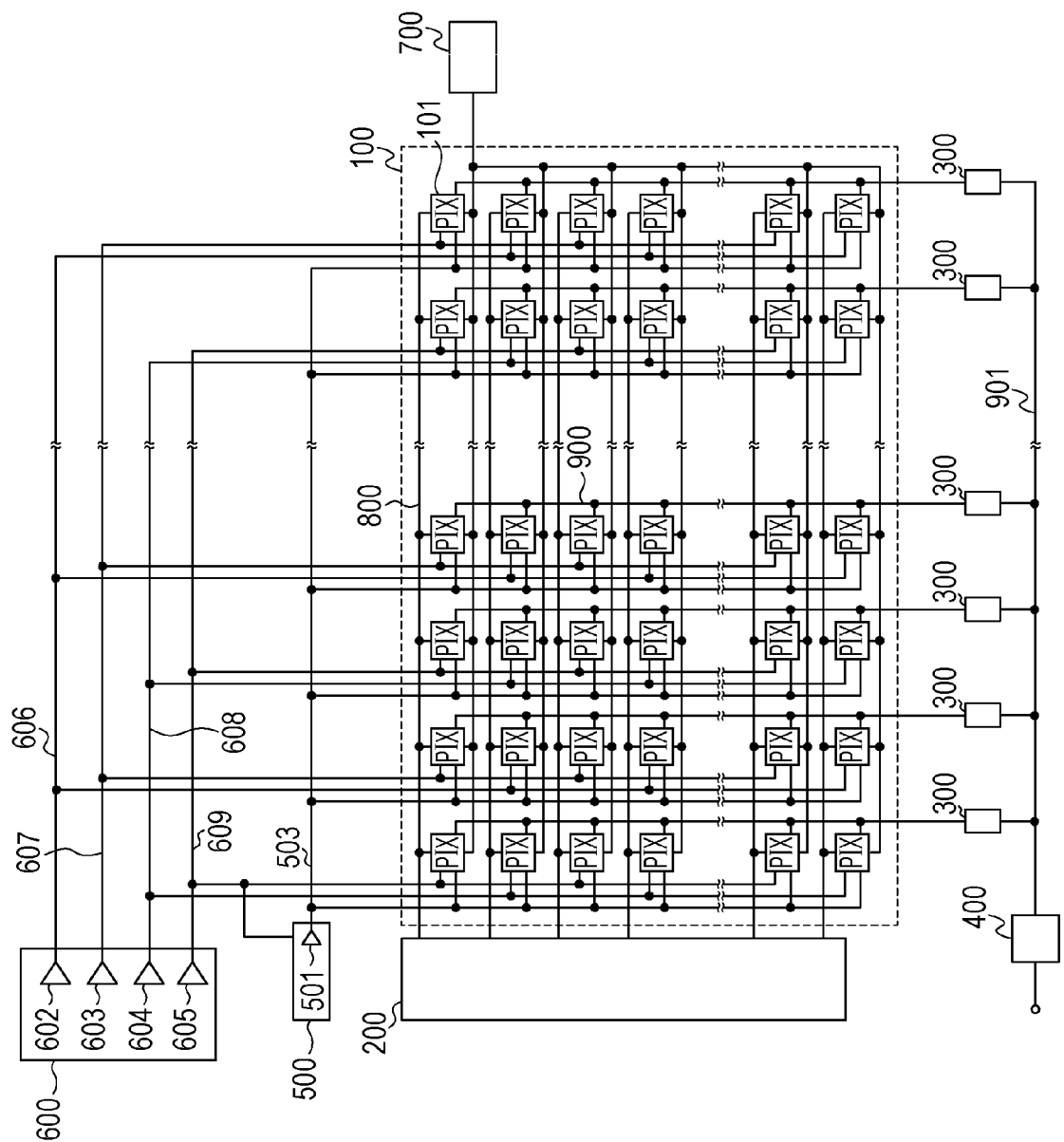
FIG. 7 is a diagram illustrating another example of the photoelectric conversion apparatus.

FIG. 7 is a block diagram illustrating the configuration of the photoelectric conversion apparatus according to the present embodiment. In the photoelectric conversion apparatus illustrated in FIG. 7, components having the same functions as in FIG. 5 are given the same reference numerals as in FIG. 5, and description thereof is omitted.

In the photoelectric conversion apparatus according to the present embodiment, different reference signal generators are connected to pixels 101 in each row and column. A reference signal unit 600 includes a plurality of reference signal generators 602, 603, 604, and 605. A reference signal generator serves as an electrical signal supply unit in the present embodiment. A reference signal Vref is an electrical signal supplied to an analog-to-digital conversion unit of each pixel 101 from each of the reference signal generators 602, 603, 604, and 605. The first reference signal generator 602 and a pixel 101 in a second row and a second column are connected to each other through a first reference signal line 606. The second reference signal generator 607 and a pixel 101 in a first row and a second column are connected to each other through a second reference signal line 607. The third reference signal generator 604 and a pixel 101 in a second row and a first column are connected to each other through a third reference signal line 608. The fourth reference signal generator 605 and a pixel 101 in a first row and a first column are connected to each other through a fourth reference signal line 609. That is, the four pixels 101 in the two rows and the two columns are connected to different reference signal generators. In other words, this is a mode in which different ramp signal generators are connected to the pixels 101 in each row and column.

In the present embodiment, a mode is adopted in which the ramp signal unit 500 includes a single ramp signal generator 501.

Figure 8A:
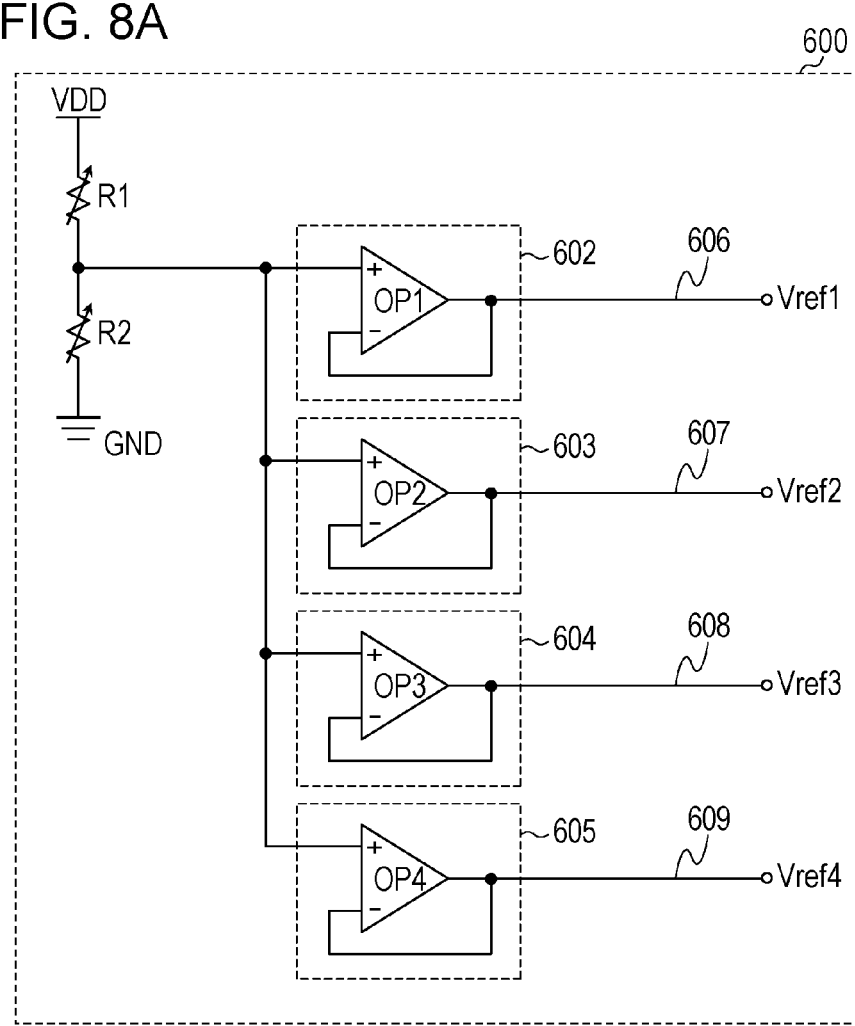
FIG. 8A is a diagram illustrating another example of the electrical signal supply unit.

Next, an example of the configuration of the reference signal unit 600 according to the present embodiment will be described. FIG. 8A is a diagram illustrating an example of the configuration of the reference signal unit 600.

The reference signal unit 600 includes variable resistors R1 and R2 and operational amplifiers OP1, OP2, OP3, and OP4. The variable resistors R1 and R2 are connected in series with each other between power supply voltage VDD and ground voltage GND. A non-inverting input terminal of each of the operational amplifiers OP1, OP2, OP3, and OP4 is connected to a node between the variable resistors R1 and R2 in common. An output terminal and an inverting input terminal of each of the operational amplifiers OP1, OP2, OP3, and OP4 are connected to each other. The reference signal generators 602, 603, 604, and 605 are configured by including the operational amplifiers OP1, OP2, OP3, and OP4, respectively. The output terminals of the operational amplifiers OP1, OP2, OP3, and OP4 are connected to the reference signal lines 606, 607, 608, and 609, respectively.

Figure 8B:
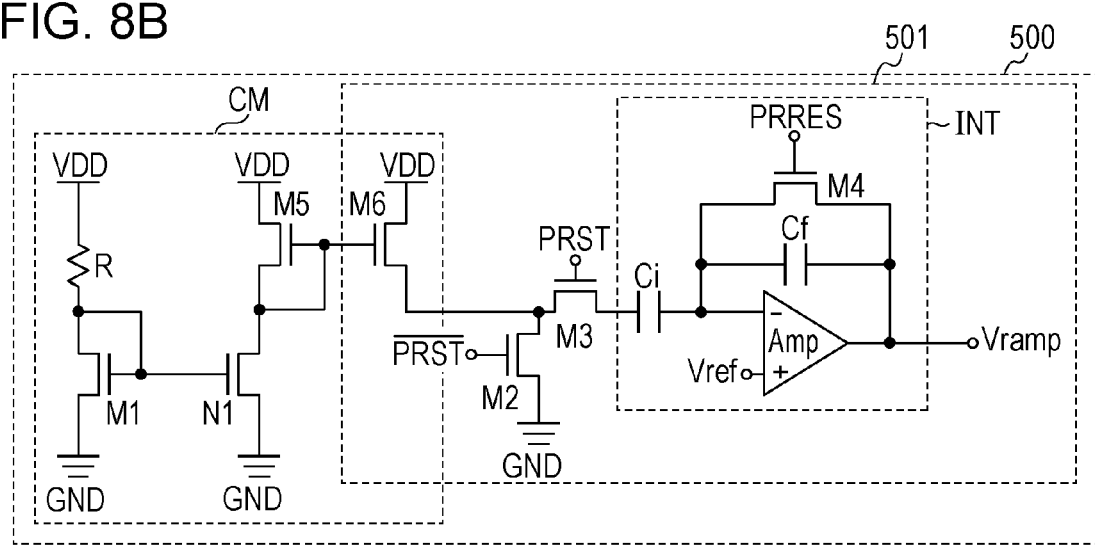
FIG. 8B is a diagram illustrating another example of the electrical signal supply unit.

Next, the ramp signal unit 500 according the present embodiment will be described. FIG. 8B is a diagram illustrating an example of the configuration of the ramp signal unit 500 according to the present embodiment. The ramp signal unit 500 according to the present embodiment includes a current mirror CM and a first ramp signal generator 501. The first ramp signal generator 501 includes transistors M2 and M3, a capacitor Ci, and an integrating circuit INT. A control electrode of the transistor M1 is connected to a control electrode of a transistor N1.

As in the first embodiment, the photoelectric conversion apparatus according to the present embodiment may be operated on the basis of the timing chart illustrated in FIG. 3.

The photoelectric conversion apparatus according to the present embodiment includes the reference signal unit 600 including the plurality of reference signal generators 602, 603, 604, and 605. Therefore, loads on each of the reference signal generators 602, 603, 604, and 605 may be reduced, thereby reducing the time taken for the potential of the reference signals Vref to stabilize. Accordingly, the speed of the operation of the analog-to-digital conversion unit of each pixel 101 may be increased. In addition, in the photoelectric conversion apparatus according to the present embodiment, too, by connecting different reference signal generators to the pixels 101 in adjacent rows and columns, the spatial frequency of an image becomes high, thereby obtaining an image in which humans hardly recognize pattern noise.

The present embodiment has been described on the basis of a mode of the comparator 102 that compares the potential of the one input terminal of the comparator 102 with the level of the ramp signal Vramp whose signal value changes over time, the ramp signal Vramp being supplied to the other input terminal of the comparator 102. The present embodiment is not limited to this mode, and may be properly implemented using an analog-to-digital converter of a different type, instead. For example, a case in which a successive approximation analog-to-digital converter is used will be described.

Figure 9:
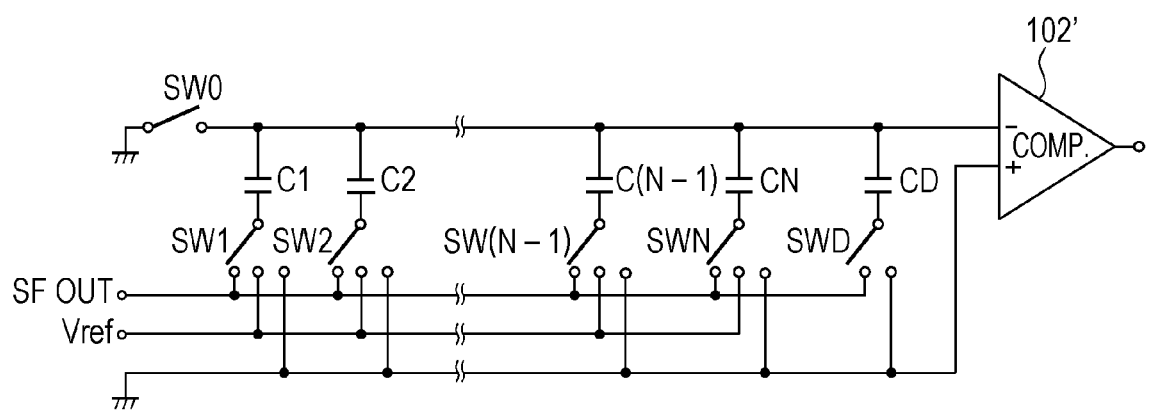
FIG. 9 is a diagram illustrating another example of the analog-to-digital conversion unit.

FIG. 9 is a diagram illustrating the configuration of a circuit of an N-bit successive approximation analog-to-digital converter. One terminal of each of N capacitors C1, C2, . . . , C(N−1), and CN and one terminal of a capacitor CD are connected to one input terminal of a comparator 102' in common. A switch SW0 switches the conductivity of the one input terminal of the comparator 102' and the one terminal of each of the N capacitors C1 to CN and the capacitor CD to the ground voltage GND. With respect to the values of capacitance of the N capacitors C1 to CN, if the value of capacitance of the capacitor C1 is denoted by C, the value of capacitance of the capacitor C2 is C/2, the value of capacitance of the capacitor C3 is C/4, the value of capacitance of the capacitor C(N−1) is C/(2^(N−1)) (^N indicates a power hereinafter; that is, C/(2^(N−1)) is a value obtained by dividing C by the (N−1)th power of 2), and the value of capacitance of the capacitor CN is C/(2^N). The capacitor CD and the capacitor CN have the same value of capacitance.

Another terminal of each of the N capacitors C1 to CN is connected to an output signal SF OUT of a transistor SF, a reference signal Vref, or the ground voltage GND by switches SW1 to SWN, respectively. Another terminal of the capacitor CD is connected to the output signal SF OUT of the transistor SF or the ground voltage GND by a switch SWD. Another terminal of the comparator 102' is connected to the ground voltage GND.

Next, the operation of the successive approximation analog-to-digital converter will be described.

First, the switch SW0 is closed and the switches SW1 to SWN and SWD are connected to the ground voltage GND, in order to reset charge in the N capacitors C1 to CN and the capacitor CD.

Next, while the switch SW0 remains closed, the switches SW1 to SWN and SWD are connected to the output signal SF OUT. Thereafter, the switch SW0 is opened, and the switches SW1 to SWN and SWD are connected to the ground voltage GND. If the amount of change in the output of a source follower circuit caused by transferring signal charge accumulated in a photoelectric conversion unit PD to an FD portion in this operation is denoted by S, the potential of the one input terminal of the comparator 102' is −S.

Next, in order to convert a highest bit, the switch SW1 is connected to the reference signal Vref. In addition, the switch SWD is connected to the ground voltage GND. In doing so, the potential of the one input terminal of the comparator 102' becomes −S+Vref/2. The comparator 102' compares this potential with the ground voltage GND applied to the other input terminal, and outputs a comparison result signal. Similarly, the switches SW2 to SWN are sequentially connected to the reference signal Vref. The switch SWD remains connected to the ground voltage GND. The comparator 102' sequentially outputs comparison result signals in accordance with the sequential connection of the switches SW2 to SWN. In doing so, the signal output from the transistor SF is converted into an N-bit digital signal.

The reference signal unit 600 supplies the reference signal Vref to the plurality of pixels 101. Therefore, when only one reference signal generator is provided, loads generated by charging and discharging the capacitors C1 to CN of each pixel 101 are applied to the one reference signal generator. In contrast, in the present embodiment, by providing the plurality of reference signal generators, the loads generated by charging and discharging the capacitors C1 to CN of each pixel 101 may be distributed between the plurality of reference signal generators. Therefore, the time taken for the reference signals Vref to stabilize may be reduced. Accordingly, the speed of the operation of the analog-to-digital conversion unit of each pixel 101 may be increased.

Although a mode in which the reference signal unit 600 includes a plurality of reference signal generators has been described in the present embodiment, a mode in which, for example, as in the third embodiment, a plurality of ramp signal generators are provided may be adopted, instead.

In the present embodiment, an analog-to-digital conversion unit that compares a ramp signal whose signal value changes over time with a signal output from a signal output unit and a successive approximation analog-to-digital converter have been described. The present embodiment is not limited to these modes, and may be implemented using analog-to-digital conversion units of various types, instead.

Fifth Embodiment

A photoelectric conversion apparatus according to the present embodiment will be described hereinafter with reference to the drawings. In the following description, differences from the fourth embodiment will be mainly described.

Figure 10:
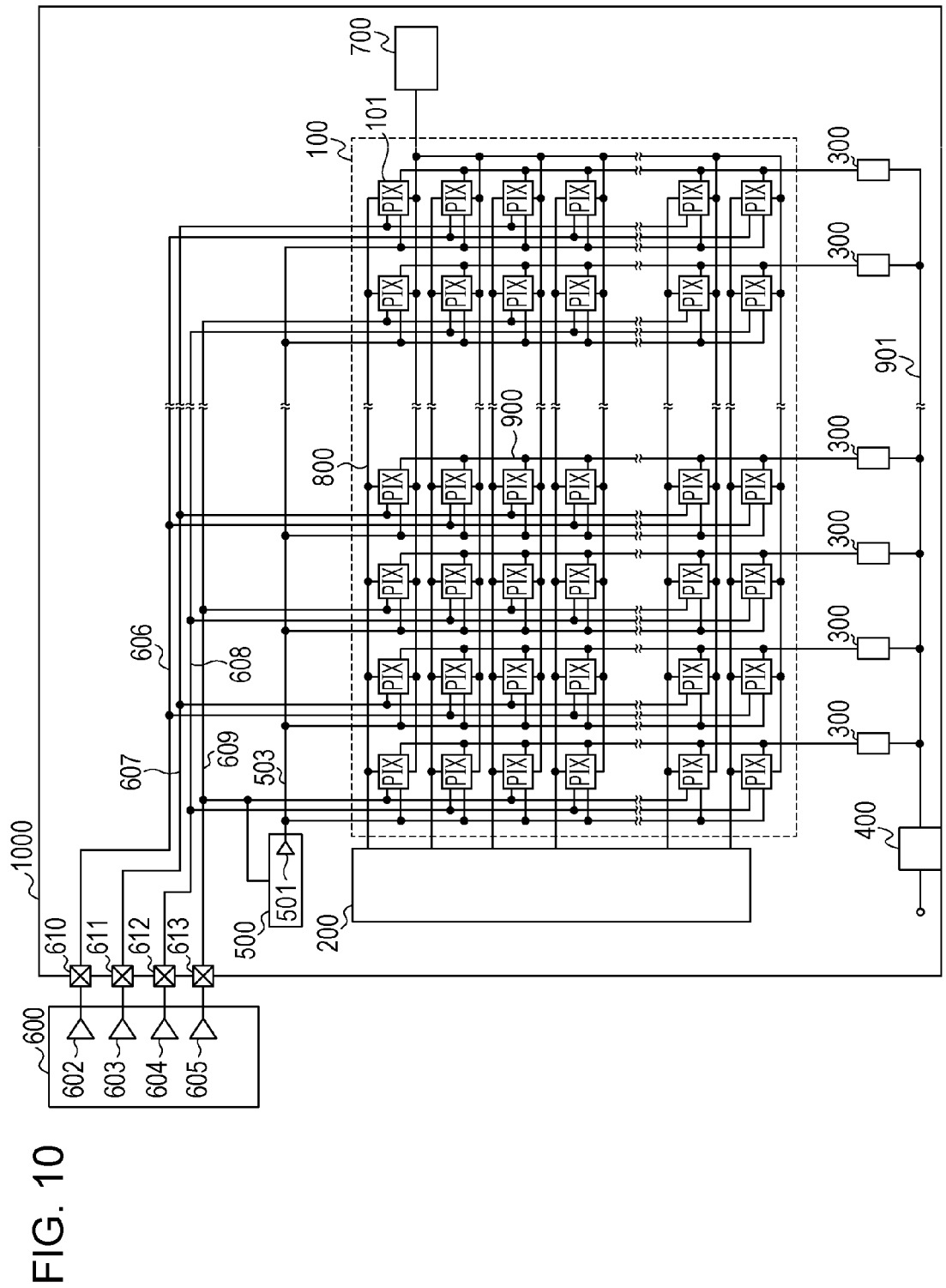
FIG. 10 is a diagram illustrating another example of the photoelectric conversion apparatus.

FIG. 10 is a block diagram illustrating the configuration of the photoelectric conversion apparatus according to the present embodiment. In the photoelectric conversion apparatus illustrated in FIG. 10, components having the same functions as in FIG. 7 are given the same reference numerals as in FIG. 7, and description thereof is omitted.

The photoelectric conversion apparatus according to the present embodiment adopts a mode in which a reference signal unit 600 is provided on a substrate different from a semiconductor substrate on which pixels 101 are provided.

In the photoelectric conversion apparatus according to the present embodiment, a pixel array 100, a timing generation unit 200, line memories 300, an output unit 400, a ramp signal unit 500, and a counter 700 are provided on a semiconductor substrate 1000. The reference signal unit 600 is provided on a substrate different from the semiconductor substrate 1000. That is, the reference signal unit 600 is provided outside the semiconductor substrate 1000.

As in the fourth embodiment, the reference signal unit 600 includes four reference signal generators 602, 603, 604, and 605. As in the fourth embodiment, the photoelectric conversion apparatus according to the present embodiment adopts a mode in which different reference signal generators are connected to the pixels 101 in each row and column.

The reference signal generators 602, 603, 604, and 605 are connected to reference signal lines 606, 607, 608, and 609 through terminals 610, 611, 612, and 613, respectively.

A mode in which the reference signal unit 600 is provided on a substrate different from the semiconductor substrate 1000 has been described in the present embodiment. As another mode, a mode may be adopted in which the ramp signal unit 500 includes a plurality of ramp signal generators, and the ramp signal unit 500 is provided on a substrate different from the semiconductor substrate 1000 and connected to ramp signal lines through terminals, instead.

As in the first embodiment, the photoelectric conversion apparatus according to the present embodiment may be operated on the timing chart illustrated in FIG. 3.

The photoelectric conversion apparatus according to the present embodiment may produce the same advantageous effects as in the fourth embodiment.

Sixth Embodiment

Differences between a photoelectric conversion apparatus according to the present embodiment and the photoelectric conversion apparatus according to the third embodiment will be mainly described with reference to FIGS. 12A and 12B.

The configuration of the photoelectric conversion apparatus according to the present embodiment may be the same as the configuration illustrated in FIG. 5.

Figure 12A:
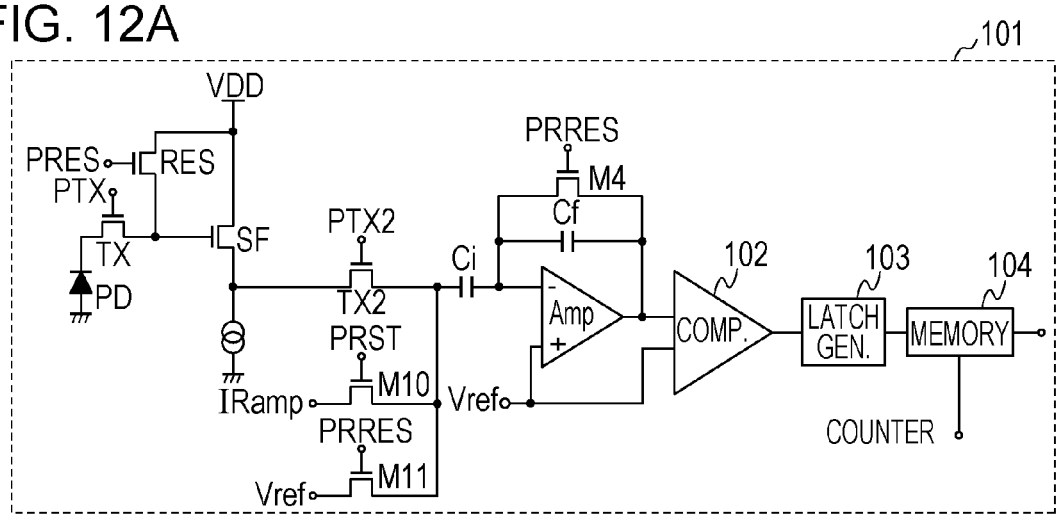
FIG. 12A is a diagram illustrating another example of the pixel.

FIG. 12A is a diagram illustrating an example of the configuration of a pixel 101 according to the present embodiment. Components having the same functions as those of the pixel 101 illustrated in FIG. 2A are given the same reference numerals as in FIG. 2A. A transistor TX2 controls the continuity between a transistor SF and a capacitor Ci. The transistor TX2 is controlled by a signal PTX2. When the signal PTX2 has become active, a signal output from the transistor SF is supplied to an inverting input terminal of a differential amplifier Amp through the capacitor Ci.

A transistor M10 is controlled by a signal PRST. When the signal PRST has become active, a ramp signal IRamp is supplied to the inverting input terminal of the differential amplifier Amp through the capacitor Ci.

A transistor M11 is controlled by a signal PRRES. When the signal PRRES has become active, a reference signal Vref is supplied to the inverting input terminal of the differential amplifier Amp through the capacitor Ci.

A transistor M4 is controlled by a signal PRRES. When the signal PRRES has become active, a feedback path of the differential amplifier Amp becomes conductive, and charge in the capacitor Ci and a capacitor Cf is reset.

A reference signal Vref is supplied to a non-inverting input terminal of the differential amplifier Amp.

A signal output from the differential amplifier Amp is supplied to one terminal of a comparator 102. A reference signal Vref is supplied to another terminal. The comparator 102 outputs a comparison result signal obtained by comparing the signal output from the differential amplifier Amp with the reference signal Vref to a latch signal generator 103. The reference signals Vref supplied to the differential amplifier Amp and the comparator 102 are provided by a reference signal unit 600.

An analog-to-digital conversion unit of each pixel 101 according to the present embodiment is configured by including an integrating circuit including the differential amplifier Amp, the capacitor Ci, and the feedback capacitor Cf, the comparator 102, the latch signal generator 103, and a pixel memory 104.

Figure 12B:
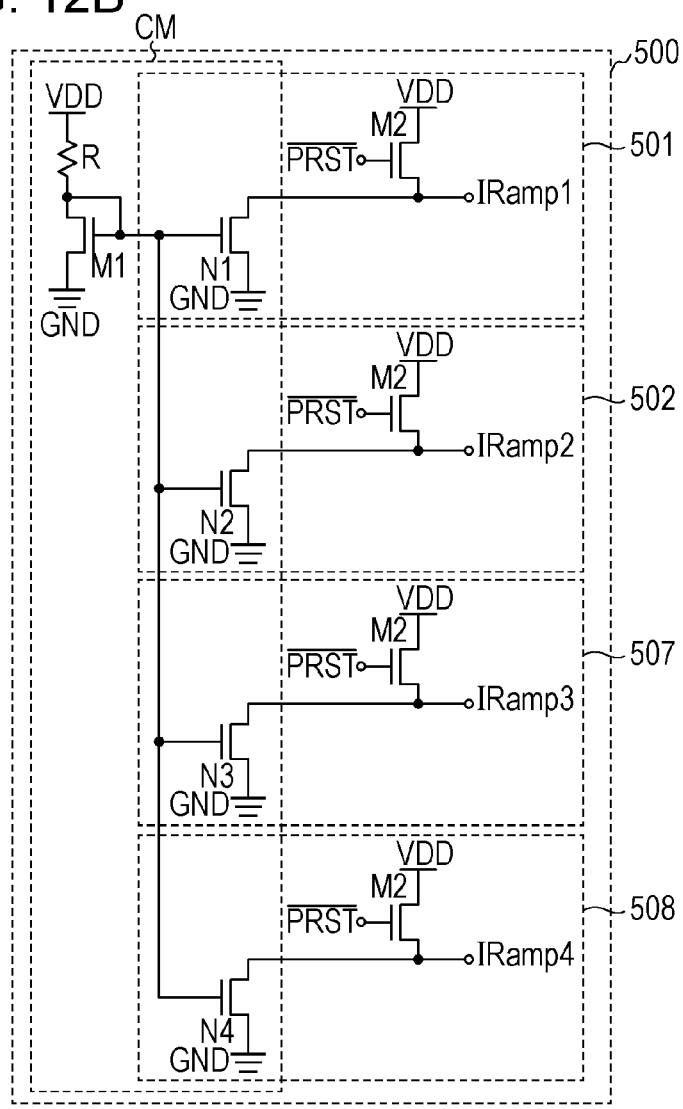
FIG. 12B is a diagram illustrating another example of the electrical signal supply unit.

Next, FIG. 12B is a diagram illustrating an example of the configuration of a ramp signal unit 500 according to the present embodiment. The ramp signal unit 500 according to the present embodiment includes a current mirror CM and ramp signal generators 501, 502, 507, and 508. The current mirror CM includes a resistor R and transistors M1, N1, N2, N3, and N4. The ramp signal generator 501 includes the transistor N1 and a transistor M2. One main electrode of the transistor N1 is connected to ground voltage GND, and another main electrode is connected to a node between the transistor M10 included in each pixel 101 and one main electrode of the transistor M2. Another main electrode of the transistor M2 is connected to voltage VDD. A ramp signal IRamp1 output from the ramp signal generator 501 is supplied to the transistor M10 of each pixel 101 through a ramp signal line 503. Similarly, the ramp signal generators 502, 507, and 508 include the transistors N2, N3, and N4, respectively, and transistors M2. Ramp signals IRamp2, IRamp3, and IRamp4 output from the ramp signal generators 502, 507, and 508, respectively, are supplied to the transistor M10 of each pixel 101 through ramp signal lines 504, 505, and 506, respectively.

Figure 13:
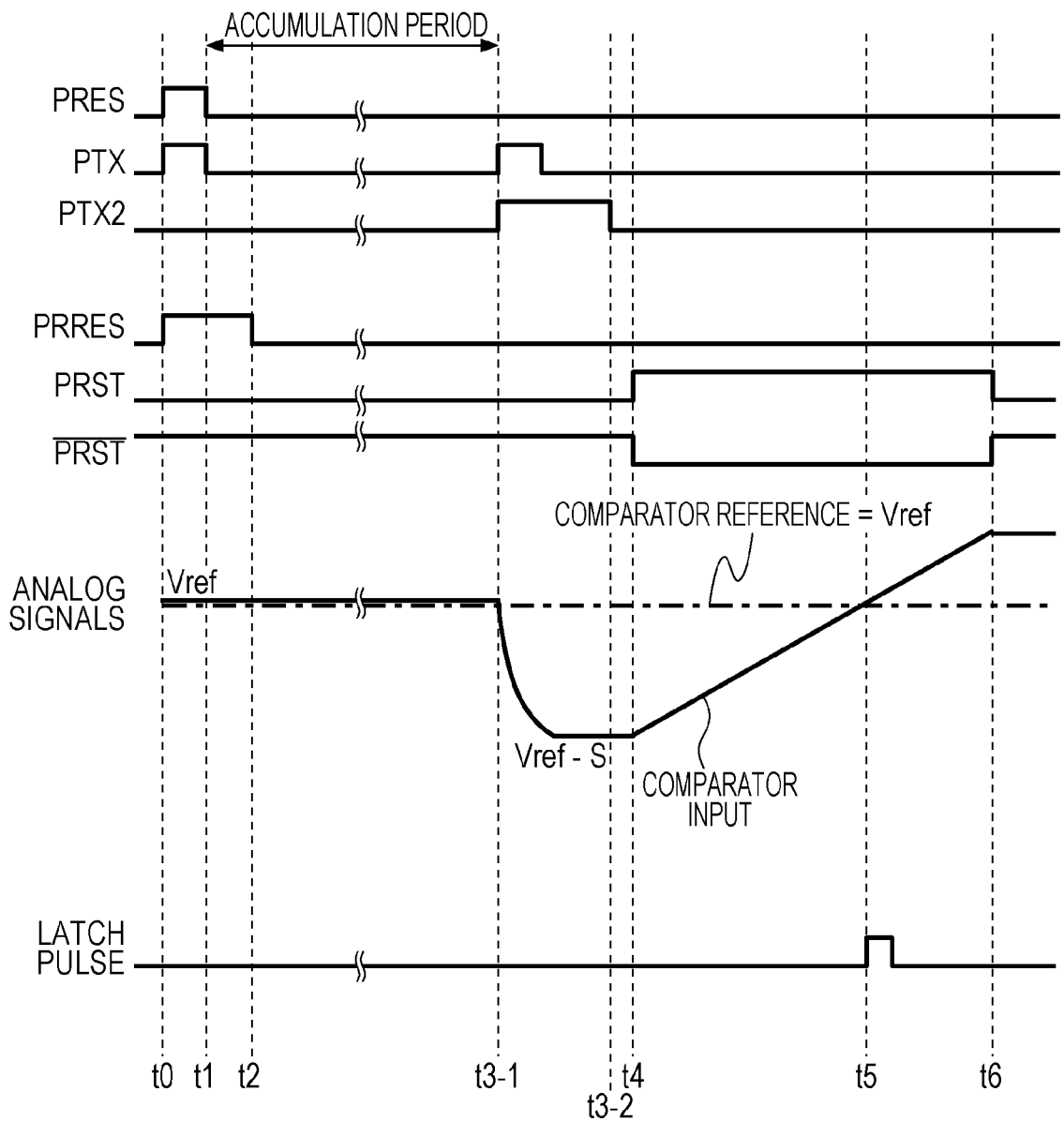
FIG. 13 is a diagram illustrating another example of the operation of the photoelectric conversion apparatus.

Next, the operation of the photoelectric conversion apparatus according to the present embodiment will be described. FIG. 13 is a timing chart illustrating an example of the operation of the photoelectric conversion apparatus according to the present embodiment.

At a time t0, a signal PTX2 is at the L level. Other operations may be the same as those at the time t0 described with reference to FIG. 3.

Operations at times t1 and t2 may be the same as those at the times t1 and t2 described with reference to FIG. 3. The capacitors Ci and Cf hold charge based on the potential at a time t3.

At a time t3-1, the signal PTX2 becomes the H level. As described with reference to FIG. 3, the signal PTX becomes the H level. Therefore, the signal output from the transistor SF is output to the differential amplifier Amp through the capacitor Ci. The differential amplifier Amp outputs, to the comparator 102, a signal amplified on the basis of a capacity ratio of the capacitor Ci to the capacitor Cf.

At a time t3-2, the signal PTX2 becomes the L level, and the feedback capacitor Cf holds the signal amplified and output by the differential amplifier Amp.

At a time t4, the pulse PRST becomes the H level, and the ramp signal IRamp is supplied to the differential amplifier Amp through the capacitor Ci. The potential of the signal output from the differential amplifier Amp to the comparator 102 gradually increases.

At a time t5, a magnitude relationship between the reference signal Vref and the signal output from the differential amplifier Amp is reversed, and the latch signal generator 103 outputs a latch signal of the H level. Upon receiving the latch signal, the pixel memory 104 holds the current count value.

At a time t6, the signal PRST becomes the L level, and the gradual increase in the signal output from the differential amplifier Amp stops, which ends the analog-to-digital conversion period.

The ramp signal unit 500 according to the present embodiment includes the plurality of ramp signal generators 501, 502, 507, and 508. Therefore, loads on each of the ramp signal generators 501, 502, 507, and 508 may be reduced, thereby reducing the time taken for the current of the ramp signals IRamp to stabilize. Accordingly, the speed of the operation of the analog-to-digital conversion unit of each pixel 101 may be increased.

In the photoelectric conversion apparatus according to the present embodiment, a mode is adopted in which different ramp signal generators are connected to the pixels 101 in each row and column. More specifically, pixels in n rows by m columns (n and m are natural numbers equal to or larger than 2) are determined as a block, and the pixels in each block are connected to different ramp signal generators in each row and column. The photoelectric conversion apparatus according to the present embodiment is not limited to this mode, and, for example, the pixels 101 may be connected to different ramp signal amplifiers either in each row or in each column as described in the first and second embodiments. That is, insofar as a mode in which the ramp signal unit 500 includes a plurality of ramp signal generators is adopted, the present embodiment may be properly implemented.

In addition, in the present embodiment, a mode has been described in which the feedback capacitor Cf holds the signal output from the transistor SF and the integrating circuit supplies the signal to the comparator 102 by charging or discharging the feedback capacitor Cf using the ramp signal IRamp. Alternatively, a mode different from the mode in which the integrating circuit is connected to the transistor SF may be adopted, instead. That is, a mode may be adopted in which the output of the transistor SF is supplied to the one terminal of the comparator 102, and the output of the integrating circuit is supplied to the other terminal of the comparator 102, instead. In this mode, the ramp signal IRamp is supplied to the inverting terminal of the differential amplifier Amp of the integrating circuit, and the reference signal Vref is supplied to the non-inverting input terminal.

In addition, in the present embodiment, a mode has been described in which the plurality of ramp signal generators that supply the ramp signals IRamp are provided. As another mode, a mode may be adopted in which a plurality of reference signal generators are provided and reference signals Vref are supplied to a pixel and another pixel from different reference signal generators. This mode produces an advantageous effect that the time taken for the potential of the reference signals Vref to stabilize may be reduced. Alternatively, a mode may be adopted in which, in addition to providing the plurality of ramp signal generators, a plurality of reference signal generators are provided. A mode may be adopted in which reference signals Vref and ramp signals IRamp are supplied to a pixel and another pixel from different reference signal generators and different ramp signal generators, respectively.

Seventh Embodiment

Figure 14:
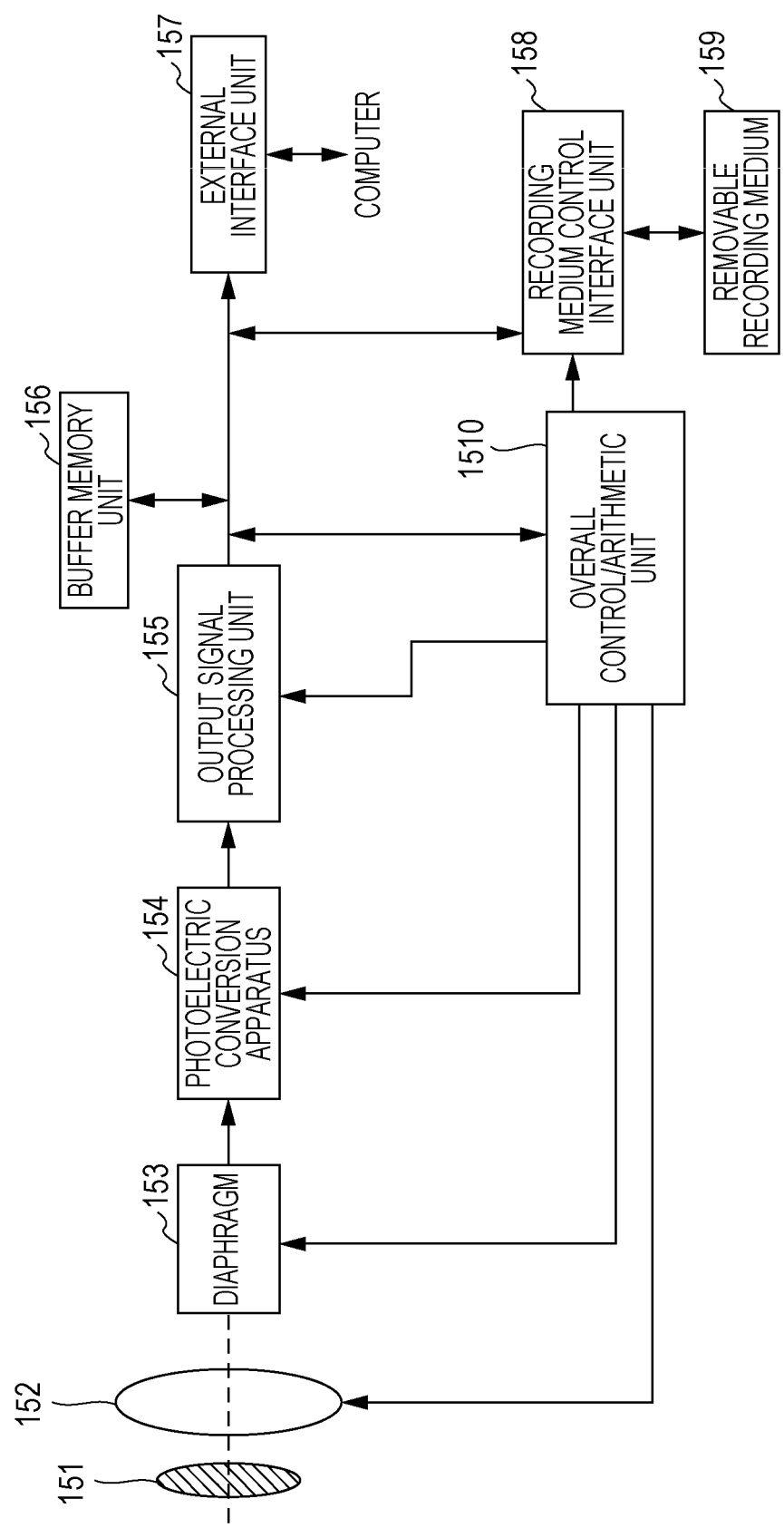
FIG. 14 is a diagram illustrating an example of a photoelectric conversion system.

FIG. 14 is a photoelectric conversion system including the photoelectric conversion apparatus according to any of the first to sixth embodiments.

In FIG. 14, the photoelectric conversion system includes a barrier 151 for protecting a lens 152, the lens 152 that forms an optical image of a subject on a photoelectric conversion apparatus 154, and a diaphragm 153 that changes the amount of light that has passed through the lens 152. The photoelectric conversion system also includes an output signal processing unit 155 that processes a signal output from the photoelectric conversion apparatus 154. The signal output from the photoelectric conversion apparatus 154 is an image pickup signal for generating a captured image of the subject. The output signal processing unit 155 performs various types of correction and compression on the image pickup signal output from the photoelectric conversion apparatus 154 as necessary, and generates an image. The lens 152 and the diaphragm 153 are an optical system that focuses light onto the photoelectric conversion apparatus 154.

The photoelectric conversion system illustrated in FIG. 14 also includes a buffer memory unit 156 for temporarily storing image data and an external interface unit 157 for communicating with an external computer or the like. The photoelectric conversion system also includes a removable recording medium 159 such as a semiconductor memory for recording or reading image pickup data and a recording medium control interface unit 158 that records or reads the image pickup data on or from the recording medium 159. The photoelectric conversion system also includes an overall control/arithmetic unit 1510 for performing various types of calculation and controlling the entirety of a digital still camera.

The photoelectric conversion apparatus 154 included in the photoelectric conversion system illustrated in FIG. 14 may adopt the mode described in any of the first to sixth embodiment. Therefore, the photoelectric conversion apparatus 154 of the photoelectric conversion system illustrated in FIG. 14, too, may produce the advantageous effects described in any of the first to six embodiments.

A state in which a member A and a member B are electrically connected to each other has been simply referred to as "connected" herein. This "connected" state refers to a state in which an electrical signal may be transmitted between the member A and the member B, and includes a mode in which an element such as a resistor or a capacitor is included in between the member A and the member B.

A mode in which an analog-to-digital conversion unit is included in each pixel 101 has been described herein. As another mode, a mode may be adopted in which an analog-to-digital conversion unit is shared by a plurality of pixels 101. That is, a mode may be adopted in which a first analog-to-digital conversion unit and a second analog-to-digital conversion unit are provided in a pixel array 100 in which a plurality of pixels 101 are arranged, and a first electrical signal supply unit that supplies an electrical signal to the first analog-to-digital conversion unit and a second electrical signal supply unit that supplies an electrical signal to the second analog-to-digital conversion unit are included. In the case of a mode in which an analog-to-digital conversion unit includes an integrating circuit as in the sixth embodiment, a mode may be adopted in which each pixel 101 includes the integrating circuit, and a comparator 102, a latch signal generator 103, and a pixel memory 104 are shared by the plurality of pixels 101, instead.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-033357 filed Feb. 17, 2012, which is hereby incorporated by reference herein in its entirety.

What is claimed is:

1. A photoelectric conversion apparatus comprising:
    a pixel array configured to include a plurality of pixels;
    a first electrical signal supply unit configured to supply an electrical signal; and
    a second electrical signal supply unit, configured to supply an electrical signal,
    wherein each of the plurality of pixels includes a photoelectric conversion unit that generates signal charge,
    wherein the pixel array includes a first analog-to-digital conversion unit and a second analog-to-digital conversion unit each converting an analog signal based on the signal charge into a digital signal,
    wherein the first analog-to-digital conversion unit is electrically connected to the first electrical signal supply unit and converts the analog signal into the digital signal using the electrical signal supplied from the first electrical signal supply unit, and
    wherein the second analog-to-digital conversion unit is electrically connected to the second electrical signal supply unit and converts the analog signal into the digital signal using the electrical signal supplied from the second electrical signal supply unit.

2. The photoelectric conversion apparatus according to claim 1,
    wherein the plurality of pixels are arranged in a matrix,
    wherein a first pixel includes the first analog-to-digital conversion unit,
    wherein a second pixel includes the second analog-to-digital conversion unit, and
    wherein the second pixel is arranged at least in a different row or in a different column from the first pixel.

3. The photoelectric conversion apparatus according to claim 1,
    wherein the first electrical signal supply unit and the second electrical signal supply unit are ramp signal generators that generate ramp signals as the electrical signals whose signal values change over time,
    wherein the first analog-to-digital conversion unit and the second analog-to-digital conversion unit each include a comparator that compares the analog signal based on the signal charge with the ramp signal and that outputs a comparison result signal,
    wherein the first electrical signal supply unit is electrically connected to the comparator of the first analog-to-digital conversion unit, and
    wherein the second electrical signal supply unit is electrically connected to the comparator of the second analog-to-digital conversion.

4. The photoelectric conversion apparatus according to claim 3,
    wherein each of the plurality of ramp signal generators includes an integrating circuit that outputs the ramp signal.

5. The photoelectric conversion apparatus according to claim 1,
wherein the first analog-to-digital conversion unit and the second analog-to-digital conversion unit each include a comparator that includes a first terminal to which a reference signal used as a reference of a potential of the first terminal and the analog signal based on the signal charge are input, and a second terminal to which a ramp signal whose signal value changes over time is input and that compares the analog signal with the ramp signal, and outputs a comparison result signal,
wherein the first and second electrical signal supply units each generate the reference signal as the electrical signal,
wherein the first electrical signal supply unit is electrically connected to the first terminal of the comparator of the first analog-to-digital conversion unit, and
wherein the second electrical signal supply unit is electrically connected to the first terminal of the comparator of the second analog-to-digital conversion unit.

6. The photoelectric conversion apparatus according to claim 5,
wherein the first and second electrical signal supply units each include a ramp signal generator that generates the ramp signal,
wherein the second terminal of the comparator of the first analog-to-digital conversion unit is electrically connected to the ramp signal generator of the first electrical signal supply unit, and
wherein the second terminal of the comparator of the second analog-to-digital conversion unit is electrically connected to the ramp signal generator of the second electrical signal supply unit.

7. The photoelectric conversion apparatus according to claim 1,
wherein the first and second analog-to-digital conversion units are successive approximation analog-to-digital conversion units, and
wherein the first and second electrical signal supply units each generate a reference signal as the electrical signal to be supplied to a corresponding one of the successive approximation analog-to-digital conversion units.

8. The photoelectric conversion apparatus according to claim 2,
wherein the plurality of pixels are provided on a single semiconductor substrate, and
wherein the first and second electrical signal supply units are provided outside the single semiconductor substrate.

9. A photoelectric conversion system comprising:
the photoelectric conversion apparatus according to claim 1; and
a signal processing unit configured to process a signal output from the photoelectric conversion apparatus.

10. A method for driving a photoelectric conversion apparatus, the photoelectric conversion apparatus comprising:
a pixel array configured to include a first analog-to digital conversion unit, a second analog- digital conversion unit, and a plurality of pixels, each of the plurality of pixels including a photoelectric conversion unit that generates signal charge;
a first electrical signal supply unit configured to supply an electrical signal; and
a second electrical signal supply unit configured to supply an electrical signal, the method comprising:
generating signal charge using the photoelectric conversion unit in each of the plurality of pixels;
supplying the electrical signal from the first electrical signal supply unit to the first analog-to-digital conversion unit;
supplying the electrical signal from the second electrical signal supply unit to the second analog-to-digital conversion unit;
converting an analog signal based on the signal charge into a digital signal by the first analog-to-digital conversion unit using the electrical signal supplied from the first electrical signal supply unit; and
converting an analog signal based on the signal charge into a digital signal by the second analog-to-digital conversion unit using the electrical signal supplied from the second electrical signal supply unit.

11. The method for driving a photoelectric conversion apparatus according to claim 10,
wherein the first and second electrical signal supply units are ramp signal generators that generate ramp signals as the electrical signals whose signal values change over time,
wherein the first analog-to-digital conversion unit and the second analog-to-digital conversion unit each include a comparator that compares the signal based on the signal charge with the ramp signal and that outputs a comparison result signal,
wherein the first electrical signal supply unit supplies the ramp signal to the comparator of the first analog-to-digital conversion unit, and
wherein the second electrical signal supply unit supplies the ramp signal to the comparator of the second analog-to-digital conversion unit.

12. The method for driving a photoelectric conversion apparatus according to claim 10,
wherein the first analog-to-digital conversion unit and the second analog-to -digital conversion unit each include a comparator that includes a first terminal to which a reference signal used as a reference of a potential of the first terminal and the analog signal based on the signal charge are input, and a second terminal to which a ramp signal whose signal value changes over time is input and that compares the analog signal with the ramp signal, and outputs a comparison result signal,
wherein the first and second electrical signal supply units each generate the reference signal as the electrical signal,
wherein the first electrical signal supply unit supplies the reference signal to the first terminal of the comparator of the first analog-to-digital conversion unit, and
wherein the second electrical signal supply unit supplies the reference signal to the first terminal of the comparator of the second analog-to-digital conversion unit.

13. The method for driving a photoelectric conversion apparatus according to claim 10,
wherein the first and second analog-to-digital conversion units are successive approximation analog-to-digital conversion units, and
wherein the first and second electrical signal supply units each generate a reference signal as the electrical signal to be supplied to a corresponding one of the successive approximation analog-to-digital conversion units.

* * * * *